United States Patent [19]

Baumgartner et al.

[11] 4,334,176

[45] Jun. 8, 1982

[54] METHOD OF AND MEANS FOR CONTROLLING ELECTRICAL DEVICES

[75] Inventors: Kenneth A. Baumgartner, Peoria, Ill.; Grant C. Melocik, Chardon, Ohio; Keith A. Stoller, Morton, Ill.

[73] Assignee: Towmotor Corporation, Mentor, Ohio

[21] Appl. No.: 103,645

[22] PCT Filed: Sep. 11, 1979

[86] PCT No.: PCT/US79/00738

§ 371 Date: Sep. 11, 1979

§ 102(e) Date: Sep. 11, 1979

[87] PCT Pub. No.: WO81/00796

PCT Pub. Date: Mar. 19, 1981

[51] Int. Cl.³ .............................................. H02P 1/38
[52] U.S. Cl. .................... 318/102; 318/103; 318/62
[58] Field of Search .................. 307/38, 41, 141, 34; 318/41, 85, 102, 112, 139, 446, 447, 445, 345 C, 345 G, 62, 345 R, 345 CA, 345 H, 453, 439, 333, 101, 103, 65, 284

[56] References Cited

U.S. PATENT DOCUMENTS

| | | | |
|---|---|---|---|
| 3,066,245 | 11/1962 | Baker et al. | 307/38 X |
| 3,289,062 | 11/1966 | Dannettell | 318/139 |
| 3,317,802 | 5/1967 | Ogden | 318/102 |
| 3,365,640 | 1/1968 | Gurwicz | 318/345 C |
| 3,457,430 | 7/1969 | Samuelson | 307/41 |
| 4,066,913 | 1/1978 | Manning et al. | 307/38 |
| 4,138,607 | 2/1979 | Engelman | 307/38 X |

*Primary Examiner*—Ulysses Weldon
*Attorney, Agent, or Firm*—Phillips, Moore, Weissenberger, Lempio & Majestic

[57] ABSTRACT

In the control of two or more electrical devices powered by a common battery and each actuated by a separate controlled rectifier chopper circuit, at least one of which is an SCR chopper circuit, under high stress conditions requiring both electrical devices to be repeatedly and rapidly turned on and off it has been found that control over the SCR chopper circuit can be lost due to inherent inductive effects which prevent the charging of the commutating capacitor of the SCR chopper to at least full open circuit battery voltage. This problem is met by inhibiting the occurrence of an "off" actuation control signal to the SCR chopper circuit for a given period of time before and a given period of time after an "on" actuation control signal to the other chopper circuit. Thus, in a battery powered lift truck, for example, having a drive motor and a lift pump motor each actuated by an independent SCR chopper circuit, an "on" actuation control signal to the drive motor circuit is sensed and any "off" actuation control signal to the lift pump motor circuit is inhibited for a few hundred microseconds before and a few hundred microseconds after the drive motor circuit is actuated to allow the battery to return to at least full open circuit voltage before the pump motor circuit is turned off.

10 Claims, 6 Drawing Figures

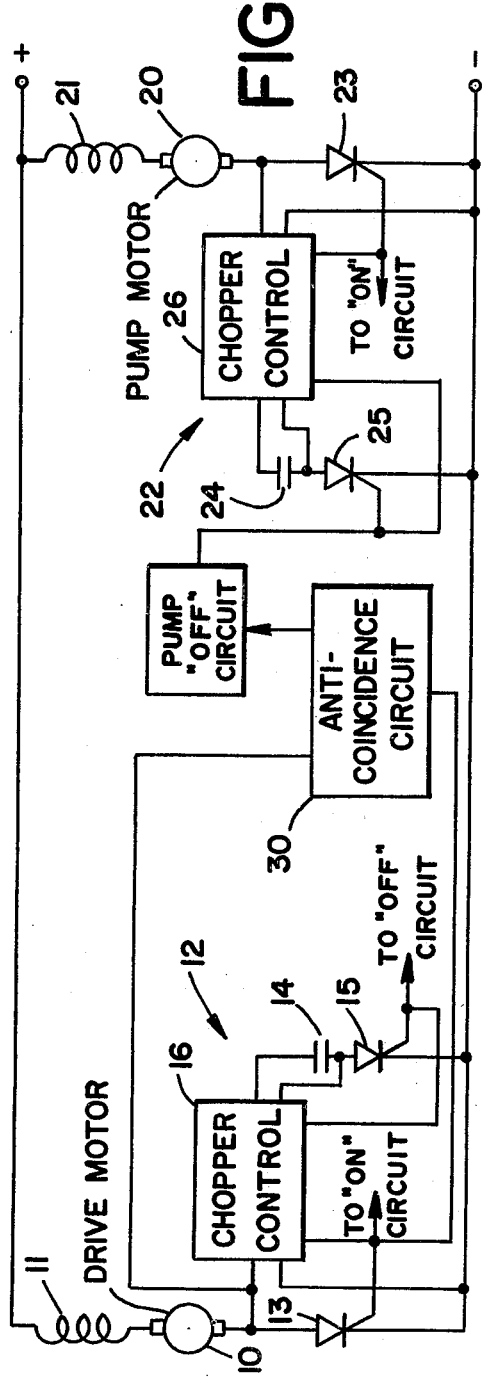
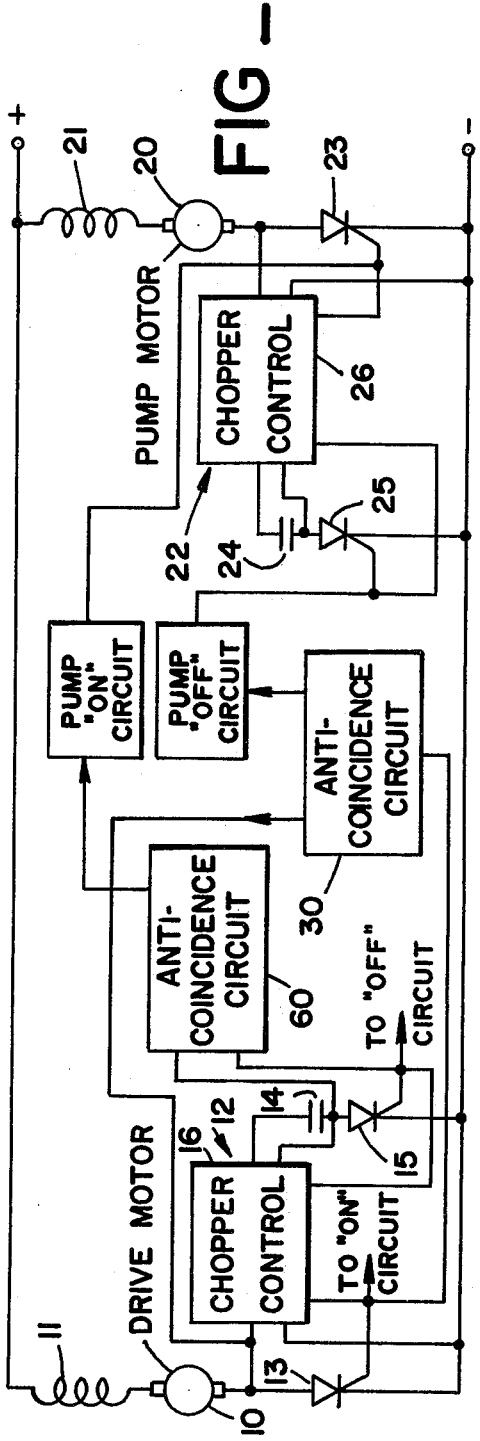

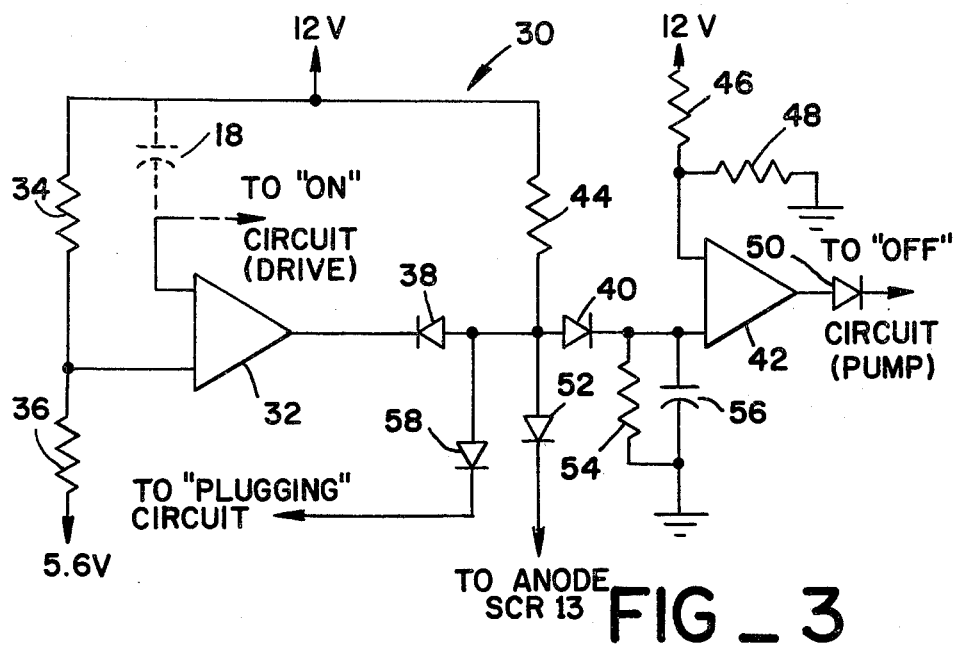
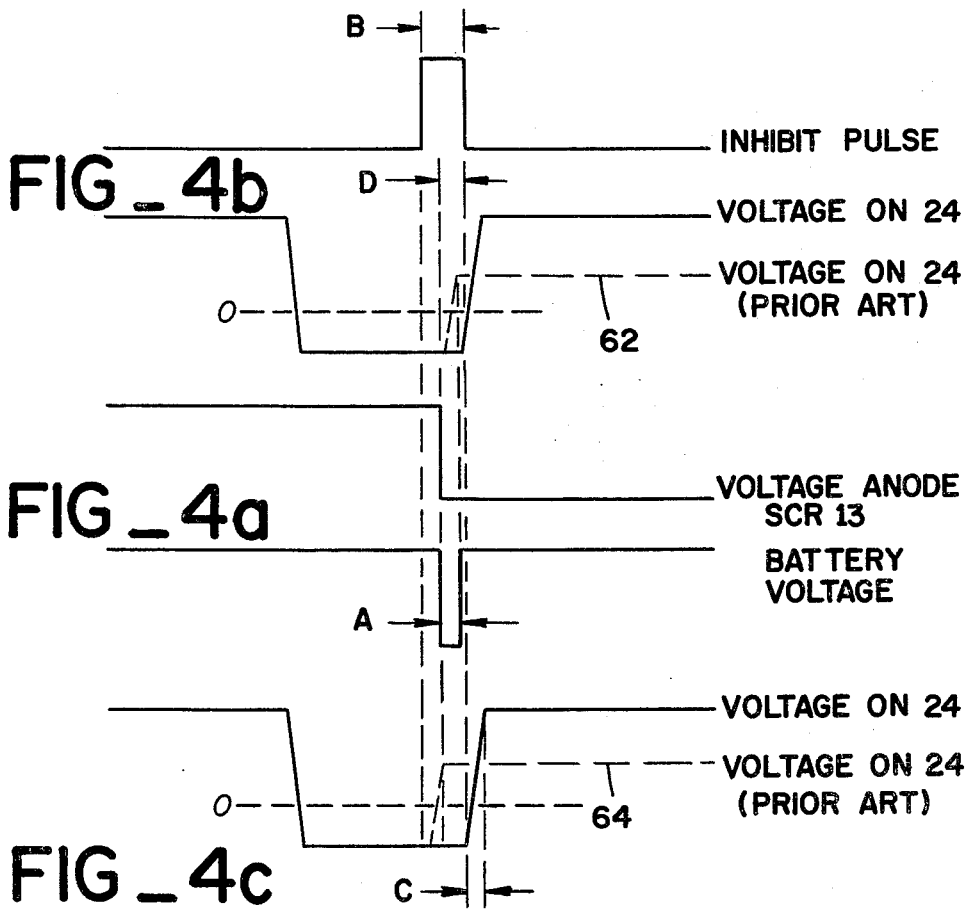

METHOD OF AND MEANS FOR CONTROLLING ELECTRICAL DEVICES

TECHNICAL FIELD

This invention relates to the control of electrical devices and more particularly to the control of a plurality of electrical devices powered by a common battery and each actuated by a separate controlled rectifier chopper circuit at least one of which is a silicon controlled rectifier (SCR) chopper circuit.

BACKGROUND ART

Control systems for battery operated motors including an SCR chopper circuit connected in series with the motor across the battery are well-known in the art. Such SCR chopper circuits include a capacitor and first silicon controlled rectifier connected in series with each other across a second silicon controlled rectifier and function as a pulse generator. Such control systems include means for adjusting the pulse frequency of the SCR chopper and thereby the mean power applied to the motor during operation. Such control systems also include means, of which the capacitor is a part, for turning the SCR chopper on and off depending on whether power to the motor is desired or not. The SCR chopper includes means operative upon turn-on thereof to stop the inductive effects on the battery from reducing the charge on the capacitor which would prevent the subsequent turn-off of the SCR chopper.

However, when systems including two or more SCR chopper actuated electrical devices, such as direct current motors, connected in parallel across a common battery are operated under the most demanding conditions, one of the SCR choppers will sometimes fail to turn off the motor actuated thereby when desired. For example, battery powered lift trucks including a drive motor and a lift or "pump" motor each actuated by a different SCR chopper are widely used and under ordinary circumstances operate without fault. However, applicant has found that under high stress circumstances, the operator may suddenly lose control of one of the motors. Thus, if the operator is trying to inch slowly up a steep ramp and, at the same time, intermittently raise the lift, there have been instances of the lift motor suddenly turning on at full speed and not responding to the turn-off control. The safety considerations raised by such an incident are very substantial.

Applicant has discovered that such incidents result from the coincidence of signals turning on one SCR chopper to actuate one motor and turning off the other SCR chopper. As is well-known in the art, the turning on of an SCR chopper results in a dip in the battery voltage due to inductive effects in the system and applicant has discovered that if a second SCR chopper powered by the same battery is turned off either during such dip or slightly before such dip occurs, there will be insufficient charge on the capacitor of the second SCR chopper to turn it off on its next cycle of operation, in spite of the means included in such SCR chopper to stop the inductive effect when operated by itself.

DISCLOSURE OF THE INVENTION

The present invention is directed to overcoming the problem as set forth above. In one aspect of the invention, a method of avoiding the coincidence of control signals in a control circuit including a single battery with a plurality of electrical devices each actuated by a different chopper circuit is provided comprising the steps of sensing a control signal to a first one of the chopper circuits, inhibiting control signals to the others of the chopper circuits from a time prior to actuation of the first chopper circuit by the sensed control signal and continuing to inhibit control signals to the other chopper circuits for a period of time after actuation of the first chopper circuit. In another aspect of this invention apparatus for controlling the operation of two electrical devices each actuated by a different chopper circuit, at least one of which is an SCR chopper circuit, and powered by a common battery to prevent the coincidence of an "off" control signal to the SCR chopper circuit with an "on" control signal to the other chopper circuit is provided comprising a means for sensing one of the control signals to a first one of the chopper circuits prior to its actuation thereby, means for inhibiting the other control signal to the other chopper circuit from a time prior to actuation of the first chopper circuit, and means for continuing to inhibit the other control signal to the other chopper circuit for at least a given period of time after actuation of the first chopper circuit.

BRIEF DESCRIPTION OF DRAWING

FIG. 1 is in part a schematic and in part a block diagram showing one embodiment of the invention.

FIG. 2 is in part a schematic and in part a block diagram showing an alternate embodiment of the invention.

FIG. 3 is a schematic diagram of the anti-coincidence circuit shown in FIG. 1.

FIGS. 4a-4c are pulse diagrams showing the operation of the circuit of FIG. 3.

BEST MODE OF CARRYING OUT THE INVENTION

Referring to FIG. 1, an embodiment of this invention suitable for use on a battery powered lift truck is shown in part schematically and in part in block diagram form. Thus, the main drive motor 10 of the lift truck together with the inherent inductance 11 of the drive circuit is shown schematically connected in series with a chopper circuit 12 across the positive and negative terminals of the battery which powers the lift truck. Similarly, the pump motor 20 which powers the lifting apparatus of the lift truck together with the inherent inductance 21 of the lifting circuit is shown schematically connected in series with a chopper circuit 22 across the positive and negative terminals of the battery which powers the lift truck.

The chopper circuit 12 includes a main current carrying silicon controlled rectifier 13 connected in series with the drive motor together with a commutating capacitor 14 and second silicon controlled rectifier 15 connected in series with each other across SCR 13 through a chopper control 16. Similarly, chopper circuit 22 includes a main current carrying silicon controlled rectifier 23 connected in series with the pump motor 20 together with a commutating capacitor 24 and second silicon controlled rectifier 25 connected in series with each other across SCR 23 through a chopper control 26.

In order to actuate the drive motor 10 an electrical pulse is applied to the trigger of SCR 13 by an "on" circuit (not shown) as indicated by the arrow in FIG. 1. SCR 13 will then continue to conduct electrical current until the current passing through it is reduced below a critical value or "holding current" for a given short period of time to enable it to regain its forward blocking characteristics. In order to "commutate" or turn off SCR 13 once it is conducting, the charge on the commutating capacitor 14 is connected across SCR 13 in reverse polarity through SCR 15. Thus, in order to deactivate the drive motor 10, an electrical pulse in connected to the trigger of SCR 15 from an "off" circuit (not shown) as indicated by the arrow in FIG. 1.

It is known in the prior art that the inherent inductance 11 of the drive motor circuit will tend to reduce the charge on the commutating capacitor 14 when SCR 13 is turned on. Thus the chopper control 16 includes appropriate circuitry to ensure that the commutating capacitor 14 will always be charged to at least the full open circuit voltage of the battery in spite of inductive effects of the drive motor circuit.

Similarly, the pump motor 20 is actuated by the application of an electrical pulse to the trigger of SCR 23 from an "on" circuit (not shown) as indicated by the arrow and deactivated by connecting the commutating capacitor 24 thereacross with reverse polarity by the application of an electrical pulse to the trigger of SCR 25 from the pump "off" circuit indicated in block diagram form. The chopper control 26 ensures that the commutating capacitor 24 will be charged to at least full battery voltage in spite of the effect of the inherent inductance 21 of the pump circuit as is known in the prior art.

According to the prior art the chopper circuit 12 for the drive motor and the chopper circuit 22 for the pump motor are controlled entirely independently of each other and under ordinary circumstances this presents no problem. However, applicant has discovered that under high stress conditions, problems can result due to the fact that the drive motor 10 and its chopper circuit 12 are powered by the same battery as the pump motor 20 and its chopper circuit 22. When the drive motor 10, for example, is actuated by triggering on SCR 13, the effective battery voltage will be reduced to a low level for a few hundred microseconds due to inductive effects. However, assuming that the pump motor 20 is running and SCR 25 is triggered to turn the pump motor off a few hundred microseconds of full battery voltage will be required in order to ensure that commutating capacitor 24 is charged to full battery voltage. Applicants' invention is based on the discovery that under high stress conditions where the drive motor and pump motor are being turned on and off repeatedly, a dip in battery voltage resulting from turning on the drive motor may overlap the time required to fully charge commutating capacitor 24 when the pump motor is turned off. The result will be that the commutating capacitor 24 will not be fully charged which will render it impossible to turn off the pump motor when desired.

According to applicants' invention, an anti-coincidence circuit 30 is provided in order to avoid any overlap between the dip in battery voltage which results from triggering SCR 13 in order to turn on the drive motor and the time required to charge commutating capacitor 24 when the pump motor 20 is turned off by the triggering of SCR 25. Thus, as indicated in FIG. 1, the anti-coincidence circuit 30 senses the triggering of SCR 13 by the drive motor "on" circuit and inhibits the triggering of SCR 25 by the pump motor "off" circuit.

Referring to FIG. 3, a preferred embodiment of the anti-coincidence circuit 30 according to this invention is shown schematically. According to this embodiment, an integrated circuit 32 electrically connected as a voltage comparator has one of its inputs connected to one side of a capacitor 18 (shown in dotted lines) of the drive "on" circuit which charges down from 12 volts to 5.6 volts in order to initiate the triggering pulse to SCR 13. The other input to the voltage comparator 32 is taken from the junction of resistors 34 and 36 connected in series with each other between the 12 volt rail and the 5.6 volt rail. The values of the resistors 34 and 36 are selected so that the voltage at their junction is higher than the 5.6 volt rail. Thus, as the capacitor 18 charges down toward the 5.6 rail, it will pass through the voltage at the junction between resistors 34 and 36. At this point, which occurs a few hundred microseconds before the capacitor 18 charges down to 5.6 volts to cause the "on" circuit to trigger SCR 13, the voltage comparator 32 will flip high. The output of voltage comparator 32 is connected to the cathode of a diode 38. The anode of the diode 38 is connected to the anode of a diode 40. The cathode of the diode 40 is connected to one input of a second integrated circuit electrically connected as a voltage comparator 42. The 12 volt rail is connected through a resistor 44 to the anodes of diodes 38 and 40. Thus, when the output of voltage comparator 32 goes high, the diode 38 will be back biased and the 12 volt rail will be applied to the input of voltage comparator 42 through diode 40. The other input of the voltage comparator 42 is connected to the junction between resistors 46 and 48 which are connected in series between the 12 volt rail and ground. Thus, when the output of voltage comparator 32 goes high the output of comparator 42 will also go high.

The output of voltage comparator 42 is connected to the pump "off" circuit through a diode 50. When the output of voltage comparator 42 is high, the pump "off" circuit will be inhibited so that it cannot generate a trigger pulse to SCR 25. From the above discussion it will be seen that the output of voltage comparator 42 will go high a few hundred microseconds before the drive "on" circuit triggers SCR 13 to actuate the drive motor.

The anode of SCR 13 is connected to the cathode of a diode 52 and the anode of diode 52 is connected to the junction between the anodes of diodes 38 and 40. As long as SCR 13 has not been triggered to its "on" condition, the voltage at its anode will be high. However, as soon as SCR 13 has been triggered to its "on" condition, the voltage thereacross will drop to a low value tending to remove the 12 volt rail from the input to voltage comparator 42 through diode 40 and flip the comparator 42 low. However, according to this invention, a resistor 54 and capacitor 56 are connected in parallel with each other to ground from the junction between the cathode of diode 40 and the first input to the voltage comparator 42. Thus, resistor 54 and capacitor 56 provide an R/C network which will tend to maintain the voltage at the first input to the voltage comparator 42 after the voltage at the anode of SCR 13 has dropped to its low value. Such voltage at the first input to voltage comparator 42 will decrease as the capacitor 56 discharges through the resistor 54 and when it reaches the value of the voltage at the junction between resistors 46 and 48 voltage comparator 42 will flip low terminating the application of the inhibiting voltage from its output through the diode 50 to the pump "off" circuit.

OPERATION

This invention and the operation of the preferred embodiment shown in FIG. 3 will be more fully understood from a study of the voltage pulse diagrams of FIGS. 4a–4c showing change in voltage with time from left to right. Thus, referring to FIG. 4a, the voltage on the anode of SCR 13 is shown high at the left hand side of FIG. 4a dropping it to its low value when triggered "on" at a given point in time at the middle of FIG. 4a and remaining low while SCR 13 is conducting as time continues to the right of FIG. 4a. As also shown in FIG. 4a, the battery voltage will dip sharply at a point in time corresponding to the point in time at which SCR 13 is triggered to its "on" condition. This dip is due to inductive effects in the circuit and will last for a given period of time depending upon the specific circuit and the inductive reactance inherent therein. Once the circuit has reached a steady state, the battery voltage will return to its normal value. The length of time during which the battery voltage is below normal or in other words, the pulse width of the dip in battery voltage, is indicated by the arrows A in FIG. 4a and in a specific embodiment of this invention, such pulse width is about 240 microseconds.

The lower solid line pulse diagram of FIG. 4b and the solid line pulse diagram of FIG. 4c both show the desired change in voltage with time on the commutation capacitor 24 of the chopper circuit for the pump motor. Thus, at the left hand side of FIGS. 4b and 4c the voltage on the commutation capacitor 24 will be high when the pump motor is not actuated. Upon actuation of the pump motor, the voltage on the commutation capacitor 24 will be reversed by chopper control 26 to a negative voltage in preparation for commutation and will remain negative so long as the pump motor is actuated. When the pump motor is turned off the voltage on the commutation capacitor 24 should return to its high value corresponding to at least the open circuit voltage of the battery.

However, referring to FIG. 4b, if the pump motor is turned off during the time A when the battery voltage is low due to the dip in battery voltage caused by turning on the drive motor, the voltage on the commutation capacitor 24 will not reach full battery voltage according to the prior art as indicated by the dashed line 62 in FIG. 4b. The inhibit pulse generated according to the teaching of this invention is indicated by the upper solid line pulse diagram of FIG. 4b. It will be seen that such inhibit pulse has a width, indicated by the arrows B, which is greater than the pulse width of the battery voltage dip, indicated by arrows A in FIG. 4a, and is timed to completely overlap the dip in battery voltage. This will, of course, prevent the pump motor from being turned off during the dip in battery voltage.

However, as indicated by the lower solid line pulse diagram of FIG. 4b and the solid line pulse diagram of FIG. 4c, a certain finite time will be required for the commutation capacitor 24 to charge up to full value even under open circuit battery voltage conditions. Such time is indicated by the arrows C in FIG. 4c and is determined by the effective time constant of the circuit of which the commutation capacitor 24 is a part. In a specific embodiment of this invention the time required for the commutation capacitor 24 to charge up to full value under open circuit battery voltage conditions is about 200 microseconds, for example.

Thus, applicant has found that if the pump motor is turned off immediately before the dip in battery voltage which results when the drive motor is subsequently turned on the commutation capacitor 24 will not charge up to the full desired value according to the prior art. For example, referring to the dashed line 64 of FIG. 4c, if the pump motor is turned off less than about 200 microseconds before the drive motor is turned on, the voltage on the commutation capacitor 24 will not reach its full desired value before the dip in battery occurs according to the prior art. Thus, according to applicants' invention the inhibit pulse must be timed to begin a period of time before the dip in battery voltage which is at least equal to the time indicated by the arrows C required for the commutation capacitor 24 to be fully charged. Similarly, the inhibit pulse according to this invention must not terminate until after the dip in battery voltage.

According to the preferred embodiment of this invention shown in FIG. 3, the voltage at the junction between resistors 34 and 36 is selected so that it will equal the voltage of the charge on the capacitor 18 about 200 microseconds before the voltage of the charge on capacitor 18 causes the "on" circuit of which it is part to trigger SCR 13. Thus, voltage comparator 32 will flip high to initiate the inhibit pulse from voltage comparator 42 200 microseconds before SCR 13 is triggered into conduction resulting in a sharp drop in its anode voltage and causing the dip in battery voltage due to actuation of the drive motor.

Similarly, the values of the resistors 54 and capacitor 56 are selected to provide an R/C time constant which will maintain the inhibit pulse for a period of time indicated by the arrow D in FIG. 4b after the voltage on the anode of SCR 13 has dropped. According to this invention, such period of time D should be at least as great as the pulse width A of the dip in battery voltage. When the capacitor 56 has discharged through the resistor 54 to a value less than the value of the voltage at the junction between resistors 46 and 48, the voltage comparator 42 will flip low to terminate the inhibit pulse. Thus, in a specific embodiment of this invention where the pulse width A of the dip in battery voltage is about 240 microseconds and the time C required for the charge on the commutation capacitor 24 to reach the full desired value is about 200 microseconds, the value of resistors 34 and 36 are selected to begin the inhibit pulse at least 200 microseconds before SCR 13 is triggered and the values of resistor 54 and capacitor 56 as well as the values of resistors 46 and 48 are selected to maintain the inhibit pulse for a period of time D which is at least 240 microseconds in duration after SCR 13 is triggered. For example, applicant has found that an inhibit pulse having a width B of 500 microseconds may be conveniently timed to begin more than 200 microseconds before SCR 13 is triggered and end more than 240 microseconds after SCR 13 is triggered in order to avoid the possibility of faults occurring in the operation of the over-all control system and without effects otherwise noticable to the operator.

Referring again to FIG. 1, it should be noted that although the anti-coincidence circuit 30 according to this invention prevents the pump motor 20 from being turned off during given intervals before and after the drive motor 10 is turned on, there is nothing to prevent coincidence of an "off" signal to the drive motor 10 with an "on" signal to the pump motor 20. As shown in FIG. 2, a second anti-coincidence circuit 60 according to the teaching of this invention would be required in order to prevent the drive motor 10 from being turned off during given intervals before and after the pump motor 20 is turned on.

The anti-coincidence circuit 60 may be identical to the anti-coincidence circuit 30. However the anti-coincidence circuit 60 need not sense an "on" signal to the pump circuit and inhibit an "off" signal to the drive circuit. Instead, as indicated in FIG. 2, the anti-coincidence circuit 60 is connected to sense an "off" signal to the drive circuit and inhibit an "on" signal to the pump circuit. Thus, an anti-coincidence circuit 60 identical to the anti-coincidence circuit 30 shown in FIG. 3 would have one of the inputs of the voltage comparator 32 connected to monitor the voltage on a capacitive element of the "off" circuit for the drive motor 10. The values of the resistors 34 and 36 would be adjusted so that the output of the voltage comparator 32 would go high a period of time at least equal to the pulse width of the battery voltage dip (i.e., 240 microseconds) before SCR 15 is triggered to turn off the drive motor 10. This will insure that SCR 15 cannot be triggered during a dip in battery voltage which would result in an insufficient charge on the commutation capacitor 14 of the drive motor chopper circuit.

Similarly, the values of the resistor 54 and capacitor 56 as well as the values of resistors 46 and 48 would be adjusted so that the inhibit pulse produced by voltage comparator 42 will be maintained for a period of time at least equal to the time required for the commutation capacitor 14 to charge to full open circuit battery voltage (i.e., 200 microseconds, for example). This will insure that a dip in battery voltage cannot occur while the commutation capacitor 14 is charging after SCR 15 is triggered to turn off the drive motor 10.

It is contemplated that this invention will be used in circuits where two electrical devices are operated by the same battery but only one is controlled by an SCR chopper circuit with the other electrical device being controlled by a transistor circuit or some other type of control circuit that does not include a commutation capacitor. In such an application only one anti-coincidence circuit 30 would be required in order to insure that the commutation capacitor of the SCR chopper circuit will be fully charged.

It is believed that those skilled in the art will make obvious changes in the specific circuitry shown in FIG. 3 of the drawing and described hereinabove without departing from the teaching of this invention and the scope of the following claims. Specifically, it is noted that the coincidence of other signals affecting the state of actuation of the electrical devices may be sensed and used to effect the inhibit pulse according to the teaching of this invention. For example, referring to FIG. 3, the plugging circuit of a battery operated lift truck may be connected to the cathode of a diode 58 having its anode connected to the junction of the anodes of diodes 38 and 40. "Plugging" is a term used to describe the reversal of direction of an electric vehicle under power. The cathode of the diode 58 is connected to the output of the plugging circuit which is high during normal operation of the vehicle. When the plugging circuit becomes active during reversal of direction of the electric vehicle under power, the output of the plugging circuit will alternate between high and low values. When low, the output of the plugging circuit will operate to terminate the inhibit pulse and in a specific application of this embodiment of the invention will prevent undesired interaction between the plugging circuit and the drive motor "on" circuit.

It is believed that those skilled in the art can design different specific circuits which can be substituted for the specific embodiment of this invention shown in FIG. 3 without departing from the teaching of this invention or the scope of the following claims. In order to practice the teaching of this invention, it is necessary that such a circuit prevent the occurrence of an "off" signal to an SCR chopper controlled electrical device both before and after the occurrence of an "on" signal to another chopper controlled electrical device connected in parallel therewith across a common battery. This can be accomplished by sensing either the "on" signal or the "off" signal. Furthermore, this can be accomplished either by sensing the impending occurrence of one of the signals and inhibiting the other of the signals as specifically described hereinabove, or by delaying the sensed signal while inhibiting the other signal. Other aspects, objects and advantages of this invention can be obtained from a study of the drawing, disclosure and the appended claims.

We claim:

1. The method of operating the control system for two electrical devices each connected in series with a different chopper circuit, at least one of which is an SCR chopper circuit, across a common battery to prevent the coincidence of an "off" actuation control signal to the SCR chopper circuit of one of said two electrical devices with an "on" actuation control signal to the chopper circuit of the other of said two electrical devices comprising the steps of:
   (a) sensing one of said "off" and said "on" actuation control signals to one of said chopper circuits prior to actuation of said one of said chopper circuits thereby;
   (b) inhibiting the other of said "off" and said "on" actuation control signals to the other of said chopper circuits from a time prior to actuation of said one of said chopper circuits by said one of said "off" and said "on" actuation control signals; and
   (c) continuing to inhibit said other of said "off" and said "on" actuation control signals to said other of said chopper circuits for a given period of time after actuation of said one of said chopper circuits by said one of said "off" and said "on" actuation control signals.

2. The method of claim 1 wherein said step of sensing one of said "off" and said "on" actuation control signals includes the step of comparing the voltage change of said one of said "off" and said "on" actuation control signals to a selected voltage within the range of change in voltage of said one of said "off" and said "on" actuation control signals, said step of inhibiting the other of said "off" and said "on" actuation control signals being initiated when the voltage of said one of said "off" and said "on" actuation control signals is substantially equal to said selected voltage.

3. The method of claim 1 wherein the step of continuing to inhibit said other of said "off" and said "on" actuation control signals to said other of said chopper circuits for a given period of time after actuation of said one of said chopper circuits by said one of said "off" and said "on" actuation control signals includes the step of sensing the actuation of said one of said chopper circuits.

4. The method of claim 1 wherein said "on" actuation control signal is sensed and said "off" actuation control signal is inhibited.

5. The method of claim 4 wherein the actuation of said SCR chopper circuit by said "off" actuation control signal is delayed in time without delay in time of the actuation of the other chopper circuit by said "on" actuation control signal.

6. Apparatus for controlling the operation of two electrical devices (10, 20) each connected in series with a different chopper circuit (12, 22) at least one of which is an SCR chopper circuit, across a common battery source to prevent the coincidence of an "off" actuation control signal to the SCR chopper circuit of one of said two electrical devices with an "on" actuation control signal to the chopper circuit of the other of said two electrical devices comprising:
 (a) means (32, 34, 36) for sensing one of said "off" and said "on" actuation control signals to one of said chopper circuits prior to actuation of said one of said chopper circuits thereby;
 (b) means (42) for inhibiting the other of said "off" and said "on" actuation control signals to the other of said chopper circuits from a time prior to actuation of said one of said chopper circuits by said one of said "off" and said "on" actuation control signals; and
 (c) means (54, 56) for continuing to inhibit said other of said "off" and said "on" actuation control signals to said other of said chopper circuits for a given period of time after actuation of said one of said chopper circuits by said one of said "off" and said "on" actuation control signals.

7. Apparatus as claimed in claim 6 wherein said means (32, 34, 36) for sensing one of said "off" and said "on" actuation control signals comprises a voltage comparator circuit (32) having one of said control signals applied to one of its inputs and a selected voltage within the range of change in voltage of said one of said "off" and said "on" actuation control signals applied to the other of the inputs thereof.

8. Apparatus as claimed in claim 6 wherein said means (54, 56) for continuing to inhibit said other of said "off" and said "on" actuation control signals to said other of said chopper circuits for a given period of time after actuation of said one of said chopper circuits by said one of said "off" and said "on" actuation control signals includes means (40, 52) for sensing the actuation of said one of said chopper circuits.

9. Apparatus as claimed in claim 6 wherein said means (32, 34, 36) for sensing one of said "off" and said "on" actuation control signals senses said "on" actuation control signal and said means (42) for inhibiting the other of said control signals inhibits said "off" actuation control signal.

10. In a system for controlling the operation of two electric motors (10, 20) powered by a common battery source and including a different SCR chopper circuit (12, 22) electrically connected in series with each electric motor across said battery source, each said SCR chopper circuit having a main current carrying SCR (13, 23) with a second SCR (15, 25) and a commutating capacitor (14, 24) connected in series with each other across said main current carrying SCR through a chopper control, said system also including means having a capacitive element (18) for applying an "on" actuation control signal to one of said SCR chopper circuits to trigger the main current carrying SCR thereof into conduction and independent means for applying an "off" actuation control signal to the other of said SCR chopper circuits to trigger the second SCR thereof into conduction, the improvement comprising:
 (a) a first voltage comparator (32) having one of its inputs connected to said capacitive element (18) of said means for applying an "on" actuation control signal to said one of said SCR chopper circuits;
 (b) a first voltage source providing a voltage (34, 36) within the range of voltage change on said capacitive element (18) connected to the other input of said first voltage comparator (32);
 (c) a second voltage comparator (42);
 (d) a pair of diodes (38, 40) having their anodes connected to each other with the cathode of one (38) connected to the output of said first voltage comparator (32) and the cathode of the other connected to one input of said second voltage comparator (42);
 (e) a second voltage source providing a given voltage connected to the junction between said anodes of said diodes (38, 46);
 (f) a resistor (54) and a capacitor (56) connected in parallel to said one input of said second voltage comparator (42) across said second voltage source;
 (g) a third voltage source providing a voltage (46, 48) less than said given voltage of said second voltage source connected to the other input of said second voltage comparator;
 (h) means (50) connecting the output of said second voltage comparator to inhibit the operation of said means for applying an "off" actuation control signal to the other of said SCR chopper circuits; and
 (i) means (52) connecting the anode of said main current carrying SCR of said one of said SCR chopper circuits to said junction between said anodes of said diodes (38, 40).

* * * * *